United States Patent
Kim

(10) Patent No.: US 12,043,271 B2
(45) Date of Patent: Jul. 23, 2024

(54) METHODS AND SYSTEMS FOR ESTIMATING THE MASS OF A VEHICLE

(71) Applicant: Toyota Motor Engineering & Manufacturing North America, Inc., Plano, TX (US)

(72) Inventor: Shinhoon Kim, Ann Arbor, MI (US)

(73) Assignees: Toyota Motor Engineering & Manufacturing North America, Inc., Plano, TX (US); Toyota Jidosha Kabushiki Kaisha, Aichi-ken (JP)

( * ) Notice: Subject to any disclaimer, the term of this patent is extended or adjusted under 35 U.S.C. 154(b) by 205 days.

(21) Appl. No.: 17/854,902

(22) Filed: Jun. 30, 2022

(65) Prior Publication Data
US 2024/0001938 A1    Jan. 4, 2024

(51) Int. Cl.
*B60W 40/00*    (2006.01)
*B60W 30/14*    (2006.01)
(Continued)

(52) U.S. Cl.
CPC ............ *B60W 40/13* (2013.01); *B60W 30/14* (2013.01); *B60W 40/076* (2013.01);
(Continued)

(58) Field of Classification Search
CPC .... B60W 40/13; B60W 40/076; B60W 30/14; B60W 50/00; B60W 50/14;
(Continued)

(56) References Cited

U.S. PATENT DOCUMENTS 8,798,887 B2 * 8/2014 Nickolaou ............ B60W 40/13
702/175
10,152,064 B2   12/2018 Switkes et al.
(Continued)

OTHER PUBLICATIONS

Sun, Y. et al., "A Hybrid Algorithm Combining EKF and RLS in Synchronous Estimation of Road Grade and Vehicle Mass for a Hybrid Electric Bus," Mechanical Systems and Signal Processing 68-69 (2016), https://doi.org/10.1016/j.ymssp.2015.08.015, pp. 416-430 (15 pages).
(Continued)

*Primary Examiner* — Phutthiwat Wongwian
*Assistant Examiner* — Sherman D Manley
(74) *Attorney, Agent, or Firm* — Christopher G. Darrow; Darrow Mustafa PC

(57) ABSTRACT

Systems and methods described herein concern estimating the mass of a vehicle. One embodiment uses a slope estimator to estimate the grade of a roadway on which the vehicle is traveling; inputs state estimates from the slope estimator, an estimated wheel force, and an estimated wheel acceleration to a secondary mass estimator that calculates a first estimated mass of the vehicle; selects, based at least in part on the first estimated mass, a calibration value using a tuning map; inputs the calibration value, the estimated wheel force, the state estimates, and a measurement noise value to a main mass estimator that calculates a second estimated mass of the vehicle that is more accurate than the first estimated mass due, at least in part, to the calibration value; and adjusts automatically one or more operational parameters of the vehicle based, at least in part, on the second estimated mass.

20 Claims, 5 Drawing Sheets

(51) Int. Cl.
  *B60W 40/076* (2012.01)
  *B60W 40/13* (2012.01)
  *B60W 50/00* (2006.01)
  *B60W 50/14* (2020.01)

(52) U.S. Cl.
  CPC ............ *B60W 50/00* (2013.01); *B60W 50/14* (2013.01); *B60W 2050/0026* (2013.01); *B60W 2050/0052* (2013.01); *B60W 2300/12* (2013.01); *B60W 2510/1005* (2013.01); *B60W 2510/18* (2013.01); *B60W 2510/20* (2013.01); *B60W 2520/28* (2013.01); *B60W 2530/10* (2013.01); *B60W 2552/15* (2020.02)

(58) Field of Classification Search
  CPC . B60W 2050/0026; B60W 2050/0052; B60W 2300/12; B60W 2510/1005; B60W 2510/18; B60W 2510/20; B60W 2520/28; B60W 2530/10; B60W 2552/15
  See application file for complete search history.

(56) References Cited

U.S. PATENT DOCUMENTS

| | | | |
|---|---|---|---|
| 10,612,961 | B2 | 4/2020 | Huang |
| 10,899,323 | B2* | 1/2021 | Switkes ............ B60W 30/165 |
| 2016/0082964 | A1 | 3/2016 | Chunodkar et al. |
| 2017/0043777 | A1* | 2/2017 | Books ............ B60W 30/18118 |
| 2020/0010062 | A1* | 1/2020 | Switkes ............ B60T 8/1887 |
| 2022/0396271 | A1* | 12/2022 | Lewandowski ....... B60W 10/20 |
| 2024/0001938 | A1* | 1/2024 | Kim .................. B60W 30/14 |

OTHER PUBLICATIONS

Li, X. et al., "Intelligent Two-Step Estimation Approach for Vehicle Mass and Road Grade," IEEE Access, 2020, found at https://ieeexplore.ieee.org/stamp/stamp.jsp?arnumber=9281284, Dec. 4, 2020, pp. 218853-218862 (10 pages).

Bae, H. et al., "Road Grade and Vehicle Parameter Estimation for Longitudinal Control Using GPS," Proc. of 2001 IEEE Conference on Intelligent Transportation Systems, available at https://citeseerx.ist.psu.edu/viewdoc/download?doi=10.1.1.1058.719&rep=rep1&type=pdf. pp. 1-6 (6 pages).

Fathy, H. et al., "Online Vehicle Mass Estimation Using Recursive Least Squares and Supervisory Data Extraction," 2008 American Control Conference, Seattle, WA, Jun. 11-13, 2008, available at https://folk.ntnu.no/skoge/prost/proceedings/acc08/data/papers/1307.pdf. pp. 1842-1848 (7 pages).

Cai, L. et al., "Two-Layer Structure Algorithm for Estimation of Commercial Vehicle Mass," Jouran of Automobile Engineering, 2020, vol. 23 4(2-3) pp. 378-389 abstract only linked at https://journals.sagepub.com/doi/abs/10.1177/0954407019859817, (12 pages).

Chu, W. et al., "Vehicle Mass Estimation Based on High-Frequency-Information Extraction," 7th IFAC Symposium on Advances in Automotive Control, The International Federation of Automatic Control, Sep. 4-7, 2013, Tokyo, Japan, pp. 72-76 (6 pages). found at https://www.researchgate.net/profile/Wenbo-Chu/publication/271479664_Vehicle_Mass_Estimation_Based_on_High-Frequency-Information_Extraction/.

* cited by examiner

| $Q\_m$ | Wheel Speed, KPH | | |
|---|---|---|---|
| | Slow | Med. | Fast |
| Light | 0.0002 | 2.00E-05 | 1.00E-08 |
| | 0.0002 | 2.00E-05 | 1.00E-08 |
| | 0.0002 | 2.00E-05 | 1.00E-08 |
| | 0.002 | 0.0002 | 1.00E-07 |
| Med. | 0.004 | 0.0004 | 2.00E-07 |
| | 0.008 | 0.0008 | 4.00E-07 |
| Heavy | 0.008 | 0.0008 | 4.00E-07 |

METHODS AND SYSTEMS FOR ESTIMATING THE MASS OF A VEHICLE

TECHNICAL FIELD

The subject matter described herein relates in general to vehicles and, more specifically, to systems and methods for estimating the mass of a vehicle.

BACKGROUND

In some vehicular applications, it is advantageous to be able to estimate the mass of a vehicle using an onboard system in the vehicle itself. One challenge that arises is that the mass of a passenger pickup truck or a commercial truck can vary significantly due to cargo being loaded into/onto the vehicle and/or a trailer or other towable load being hitched to the vehicle. This means the mass of such a vehicle can vary over a range as wide as its curb weight to a gross combined weight rating (GCWR) of a vehicle, which could be 10 times larger than the curb weight. Conventional mass estimation devices can have difficulty in providing accurate mass estimates over such a wide range.

SUMMARY

An example of a system for estimating the mass of a vehicle is presented herein. The system comprises a processor and a memory storing machine-readable instructions that, when executed by the processor, cause the processor to use a slope estimator to estimate the grade of a roadway on which the vehicle is traveling. The slope estimator outputs state estimates including a filtered wheel speed of the vehicle and an estimated slope of the roadway. The memory also stores machine-readable instructions that, when executed by the processor, cause the processor to input the state estimates, an estimated wheel force of the vehicle, and an estimated wheel acceleration of the vehicle to a secondary mass estimator that calculates a first estimated mass of the vehicle. The memory also stores machine-readable instructions that, when executed by the processor, cause the processor to select, based at least in part on the first estimated mass of the vehicle, a calibration value using a tuning map. The memory also stores machine-readable instructions that, when executed by the processor, cause the processor to input the calibration value, the estimated wheel force of the vehicle, the state estimates, and a measurement noise value to a main mass estimator that calculates a second estimated mass of the vehicle. The second estimated mass is more accurate than the first estimated mass due, at least in part, to the calibration value. The memory also stores machine-readable instructions that, when executed by the processor, cause the processor to adjust automatically one or more operational parameters of the vehicle based, at least in part, on the second estimated mass of the vehicle.

Another embodiment is a non-transitory computer-readable medium for estimating the mass of a vehicle and storing instructions that when executed by a processor cause the processor to use a slope estimator to estimate the grade of a roadway on which the vehicle is traveling. The slope estimator outputs state estimates including a filtered wheel speed of the vehicle and an estimated slope of the roadway. The instructions also cause the processor to input the state estimates, an estimated wheel force of the vehicle, and an estimated wheel acceleration of the vehicle to a secondary mass estimator that calculates a first estimated mass of the vehicle. The instructions also cause the processor to select, based at least in part on the first estimated mass of the vehicle, a calibration value using a tuning map. The instructions also cause the processor to input the calibration value, the estimated wheel force of the vehicle, the state estimates, and a measurement noise value to a main mass estimator that calculates a second estimated mass of the vehicle. The second estimated mass is more accurate than the first estimated mass due, at least in part, to the calibration value. The instructions also cause the processor to adjust automatically one or more operational parameters of the vehicle based, at least in part, on the second estimated mass of the vehicle.

In another embodiment, a method of estimating the mass of a vehicle is disclosed. The method comprises using a slope estimator to estimate the grade of a roadway on which a vehicle is traveling. The slope estimator outputs state estimates including a filtered wheel speed of the vehicle and an estimated slope of the roadway. The method also includes inputting the state estimates, an estimated wheel force of the vehicle, and an estimated wheel acceleration of the vehicle to a secondary mass estimator that calculates a first estimated mass of the vehicle. The method also includes selecting, based at least in part on the first estimated mass of the vehicle, a calibration value using a tuning map. The method also includes inputting the calibration value, the estimated wheel force of the vehicle, the state estimates, and a measurement noise value to a main mass estimator that calculates a second estimated mass of the vehicle. The second estimated mass is more accurate than the first estimated mass due, at least in part, to the calibration value. The method also includes adjusting automatically one or more operational parameters of the vehicle based, at least in part, on the second estimated mass of the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 1:
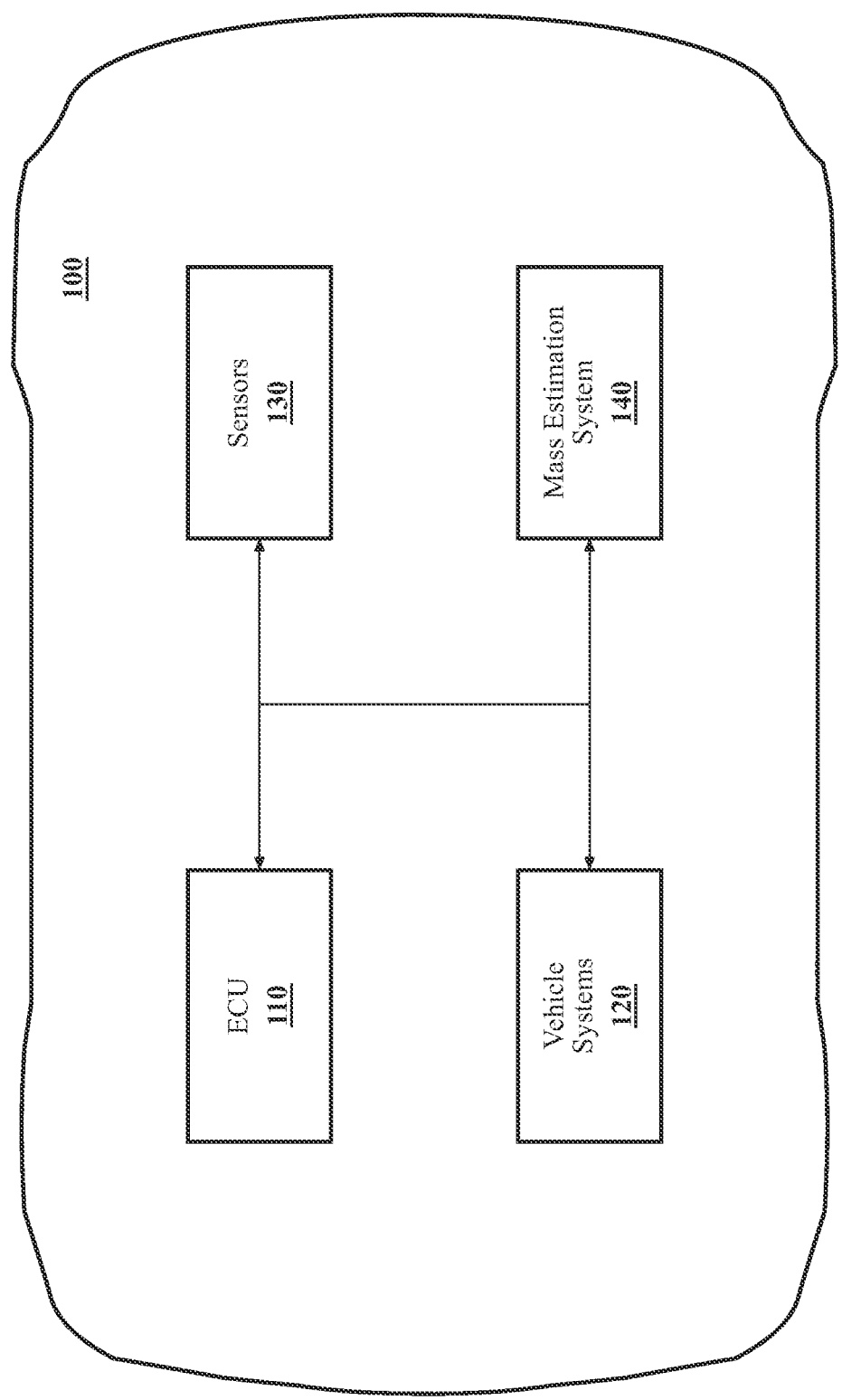
FIG. 1 illustrates one embodiment of a vehicle within which systems and methods disclosed herein may be implemented.

Conventional technology for onboard vehicle mass estimation tends to focus on one specific target mass range. Such mass estimation systems are calibrated for a particular mass range to provide rapid and accurate mass estimates. However, when a vehicle's mass can vary over a wider range than that for which a particular mass estimation system was designed, one or more different calibration values may be needed to maintain satisfactory performance over the entire range. Various embodiments described herein address this shortcoming of conventional systems by using two different mass estimation strategies in tandem. More specifically, an initial estimated vehicle mass produced by a secondary mass estimator employing a faster-but-less-accurate strategy is used by a main mass estimator employing a slower-and-more-robust strategy to change its calibration (tuning) value to obtain optimal estimation results over a wide vehicle-mass range.

In one embodiment, an onboard mass estimation system in a vehicle uses a slope estimator to estimate the grade of the roadway on which the vehicle is traveling, the slope estimator outputting state estimates that include the filtered wheel speed of the vehicle and an estimated slope (grade) of the roadway. A secondary mass estimator calculates an initial estimated mass of the vehicle (sometimes referred to herein as a "first estimated mass of the vehicle") based on the state estimates from the slope estimator, the estimated (measured) wheel force of the vehicle, and the estimated (measured) wheel acceleration of the vehicle. Based, at least in part, on the initial estimated mass of the vehicle, the system selects a calibration value using a tuning map. A main mass estimator uses this calibration value, in combination with the estimated wheel force, the state estimates mentioned above, and a measurement noise value, to calculate a second estimated mass of the vehicle. The second estimated mass is more accurate than the initial estimated mass due, at least in part, to the calibration value obtained via the initial estimated mass and the tuning map. In some embodiments, one or more operational parameters of the vehicle can then be adjusted based, at least in part, on the second, more accurate, estimated mass of the vehicle. Such adjustments can include, without limitation, adjusting operating conditions of powertrain systems to achieve optimal performance, adjusting an adaptive cruise control (ACC) system of the vehicle, adjusting a pre-collision warning system of the vehicle, and, in the case of an electric vehicle, updating the predicted travel range of the vehicle. All of these and other vehicle functions and features can be improved by an accurate estimate of the vehicle's mass.

In some embodiments, the slope estimator is implemented using a linear Kalman filter (linear KF), the secondary mass estimator is implemented using a recursive-least-squares (RLS) algorithm, and the main mass estimator is implemented using a non-linear Kalman filter (non-linear KF). In some embodiments, the tuning map includes a two-dimensional (2D) lookup table relating the initial estimated mass of the vehicle and the filtered wheel speed of the vehicle to the corresponding calibration value. In other embodiments, the lookup table simply relates the initial estimated mass of the vehicle to a corresponding calibration value. In some embodiments, the calibration value obtained from the tuning map is a process noise value, a tuning parameter that is part of the non-linear-KF model used by the main mass estimator.

In one embodiment, activation of the both the secondary mass estimator and the main mass estimator is contingent on certain predetermined activation conditions being satisfied. For example, in some embodiments, the activation conditions can include a transmission shift signal being in a predetermined transmission-shift-signal state, a brake parameter being in a predetermined brake-parameter state, the magnitude of a steering wheel angle position of the vehicle being smaller than a predetermined maximum steering wheel angle, the filtered wheel speed of the vehicle being between a predetermined minimum wheel speed and a predetermined maximum wheel speed, and the estimated wheel acceleration of the vehicle exceeding a predetermined minimum wheel acceleration.

In some embodiments, the vehicle is a passenger pickup truck, a commercial light-duty truck, or a commercial heavy-duty truck. The mass of such a vehicle can increase due to the vehicle being loaded with cargo (in the passenger compartment and/or in the bed or other cargo compartment), a towable load (e.g., a trailer) being hitched to the vehicle, or both. Throughout this description, reference to "a vehicle" encompasses the base vehicle (i.e., the pickup truck or commercial truck itself) and any towable load that is hitched to the base (towing) vehicle. In other words, the combination of a base/towing vehicle (e.g., a truck) and a towable load hitched to that vehicle is referred to herein as simply "the vehicle." Thus, the "mass of the vehicle" encompasses the mass of the base/towing vehicle and any towable load hitched to the base/towing vehicle, as well as any cargo loaded into/onto the base vehicle. "Cargo," in this context can include people (e.g., a driver, passengers), animals (e.g., pets, livestock), and various kinds of inanimate objects/materials.

Referring to FIG. 1, it illustrates one embodiment of a vehicle 100 within which systems and methods disclosed herein may be implemented. As used herein, a "vehicle" is any form of motorized land transport powered by an internal combustion engine (ICE), electricity from a battery, or both (e.g., a hybrid vehicle) combined with any towable load that might be hitched to the base/towing vehicle. In some embodiments, the base/towing vehicle 100 is a passenger pickup truck, a light-duty commercial truck, or a heavy-duty commercial truck.

The vehicle 100 also includes various elements. It will be understood that vehicle 100 can have other elements in addition to those shown in FIG. 1. Some of the possible elements of vehicle 100 pertaining to the embodiments described herein are shown in FIG. 1 and will be described in greater detail in connection with subsequent figures. It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

In the embodiment of FIG. 1, vehicle 100 includes an Electronic Control Unit (ECU) 110 that includes one or more processors. In some embodiments, vehicle 100 includes multiple ECUs (e.g., an Engine ECU and other ECUs). An Engine ECU is particularly relevant to the various embodiments described herein. Thus, in some embodiments, ECU 110 is an Engine ECU.

In this embodiment, vehicle 100 also includes sensors 130 of various types. For example, the sensors 130 can include a sensor that measures the wheel speed $\dot{x}$ of vehicle 100. In some embodiments, this sensor is part of the vehicle's anti-lock braking system (ABS). Another sensor 130 measures the proper acceleration $a_G$ of vehicle 100 that includes both the longitudinal and vertical components of the acceleration. This is also sometimes referred to as a "G measurement." In some embodiments, the acceleration sensor is an accelerometer situated at or near the vehicle's center of gravity. Other sensors 130, which, in some embodiments, are part of an Engine ECU, measure or estimate the wheel force $F_w$ and the wheel acceleration $\ddot{x}$ of vehicle 100. Sensors 130 can include a variety of other kinds of sensors, such as a sensor that detects whether and to what extent the brake pedal of vehicle 100 is being depressed, a sensor that senses the status of the vehicle's transmission shift state, and a steering-wheel-angle sensor. Some of the sensors 130 can be associated with an inertial measurement unit (IMU) and/or a Controller Area Network (CAN) bus of vehicle 100 (not shown in FIG. 1).

In the embodiment of FIG. 1, vehicle 100 also includes a set of vehicle systems 120. Vehicle systems 120 can include, for example and without limitation, a propulsion system, a braking system, a steering system, a throttle system, a transmission system, a signaling system, a navigation system, a communication system, and a towing system that supports towing towable loads such as trailers. Vehicle systems 120 can also include one or more powertrain systems, an ACC system, a pre-collision warning system, an Advanced Driver-Assistance System (ADAS), and a system, in electric or hybrid vehicles 100, that estimates the travel range of the vehicle 100.

As shown in FIG. 1, in this embodiment, vehicle 100 includes an onboard mass estimation system 140 that estimates the mass of vehicle 100 under certain predetermined conditions (e.g., the mass of vehicle 100, as defined above, has changed, and the current driving conditions permit calculating an updated estimate). In some embodiments, the estimated mass of vehicle 100 output by mass estimation system 140 is used by other vehicle subsystems and functions to improve the performance of vehicle 100, as discussed above. In some embodiments, mass estimation system 140 operates automatically in response to particular predetermined driving events. As discussed above, activation of the secondary and main mass estimators is, in some embodiments, contingent on certain predetermined activation conditions being satisfied. These predetermined activation conditions, in general, correspond to low-speed-acceleration driving situations such as vehicle 100 exiting a parking lot to merge with traffic. There are certain driving conditions that are more conducive to obtaining accurate vehicle mass estimates due to the characteristics and limitations of various sensors 130. The activation conditions help to ensure that mass estimation system 140 estimates the mass of vehicle 100 under favorable conditions.

Figure 2:
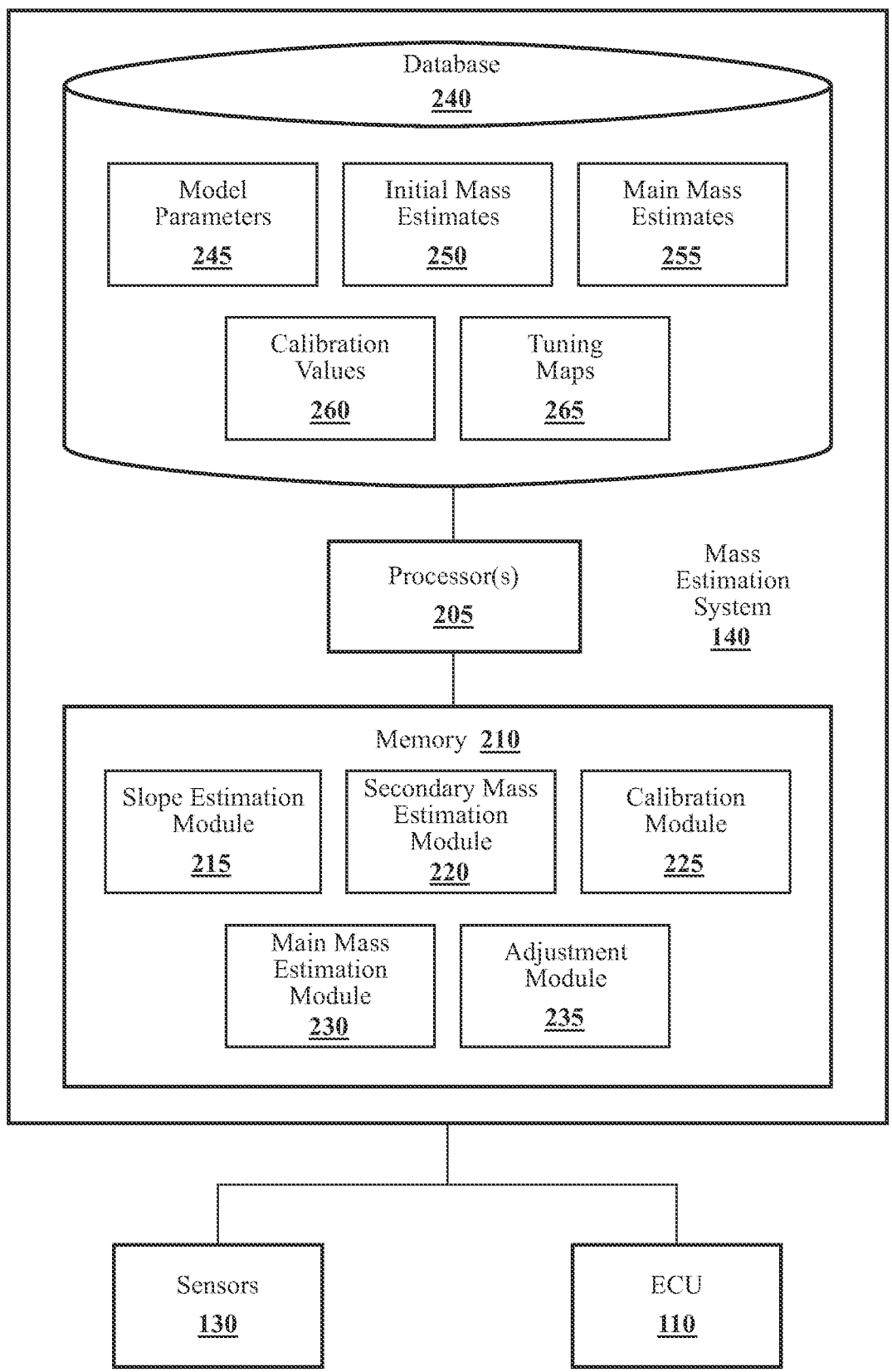
FIG. 2 is a block diagram of a mass estimation system, in accordance with an illustrative embodiment of the invention.

FIG. 2 is a block diagram of the mass estimation system 140 discussed above in connection with FIG. 1, in accordance with an illustrative embodiment of the invention. As shown in FIG. 2, mass estimation system 140 includes one or more processors 205 and a memory 210 communicably coupled with the one or more processors 205. The one or more processors 205 can be distinct from those of the ECUs of vehicle 100, or, in some embodiments, one or more processors from one or more ECUs may be shared by mass estimation system 140. In this embodiment, memory 210 stores a slope estimation module 215, a secondary mass estimation module 220, a calibration module 225, a main mass estimation module 230, and an adjustment module 235. The memory 210 is a random-access memory (RAM), read-only memory (ROM), flash memory, or other suitable memory for storing the modules 215, 220, 225, 230, and 235. The modules 215, 220, 225, 230, and 235 are, for example, computer-readable instructions that when executed by the one or more processors 205, cause the one or more processors 205 to perform the various functions disclosed herein.

Mass estimation system 140 can store various kinds of data in a database 240. For example, mass estimation system 140 can store model parameters 245, initial mass estimates 250 (from the secondary mass estimator), main mass estimates 255 (from the main mass estimator), calibration values 260, and tuning maps 265. Model parameters 245 include various parameters associated with the mathematical models underlying the slope (road grade) estimator, the secondary mass estimator, the main mass estimator, and the activation conditions discussed above. These parameters are identified and discussed in greater detail below in connection with FIG. 3. As shown in FIG. 2, mass estimation system 140 receives various kinds of sensor data from sensors 130 and is in communication with ECU 110.

Slope estimation module 215 generally includes instructions that, when executed by the one or more processors 205, cause the one or more processors 205 to use a slope estimator to estimate the grade of the roadway on which a vehicle 100 is traveling. In this context, "using a slope estimator" means using an algorithm that is part of or associated with slope estimation module 215 to estimate the grade (angle relative to level) of the roadway. In some embodiments, the slope estimator outputs state estimates that include a filtered wheel speed $\hat{\dot{x}}$ of the vehicle 100 and an estimated slope (grade) $\hat{\theta}$ of the roadway. In one embodiment, the slope estimator includes a linear KF, as discussed above. The state estimates just mentioned are outputs of the linear KF. The inputs and mathematical concepts pertaining to the slope estimator are discussed below in connection with FIG. 3.

Secondary mass estimation module 220 generally includes instructions that, when executed by the one or more processors 205, cause the one or more processors 205 to input the state estimates ($\hat{\dot{x}}$ and $\hat{\theta}$) from the slope estimator of slope estimation module 215, the estimated wheel force $F_w$ of the vehicle 100, and the estimated wheel acceleration $\ddot{x}$ of the vehicle 100 to a secondary mass estimator that calculates an initial estimated mass 250 of the vehicle 100. Herein, this initial estimated mass 250 of the vehicle 100 is sometimes referred to as a "first estimated mass" of the vehicle 100. In this context, the "secondary mass estimator" is an algorithm that is part of or associated with secondary mass estimation module 220 that estimates the mass of vehicle 100. As discussed above, the wheel force $F_w$ of the vehicle 100 and the wheel acceleration $\ddot{x}$ of the vehicle 100, in some embodiments, are measured or estimated with the aid of sensors 130 that are part of an ECU of vehicle 100. In some embodiments, the applicable ECU is, more specifically, an EFI (Electronic Fuel Injection) ECU, which is sometimes referred to in the automotive industry as an "Engine ECU." As discussed above, in some embodiments, the secondary mass estimator employs a RLS mass estimation algorithm. As also discussed above, the mass-estimation strategy employed by the secondary mass estimator produces a mass estimate (250) more rapidly than that employed by the main mass estimator, but the mass estimate produced by the secondary mass estimator is, in general, less accurate than that produced by the main mass estimator. The secondary mass estimator and its underlying mathematical concepts are discussed in greater detail below in connection with FIG. 3.

Calibration module 225 generally includes instructions that, when executed by the one or more processors 205, cause the one or more processors 205 to select, based at least in part on the initial estimated mass 250 of the vehicle 100, a calibration value 260 using a tuning map 265. In some embodiments, the tuning map 265 is a function only of the initial mass estimate 250. That is, the tuning map 265 relates an initial mass estimate 250 to a corresponding value of the calibration value 260 (e.g., via a simple lookup table). In other embodiments, the tuning map 265 is a function of two inputs. In those embodiments, tuning map 265 is a 2D lookup table that relates both the initial mass estimate 250 and the filtered wheel speed $\hat{x}$ from the slope estimator (slope estimation module 215) to the corresponding calibration value 260. The tuning map 265 is discussed in greater detail below in connection with FIGS. 3-5.

Main mass estimation module 230 generally includes instructions that, when executed by the one or more processors 205, cause the one or more processors 205 to input the calibration value 260, the estimated wheel force $F_w$ of the vehicle 100, the state estimates from the slope estimator, and a measurement noise value μm to a main mass estimator that calculates a main estimated mass 255 of the vehicle 100. Herein, this main estimated mass 255 of the vehicle 100 is sometimes referred to as a "second estimated mass" of the vehicle 100. In this context, the "main mass estimator" is an algorithm that is part of or associated with main mass estimation module 230 that estimates the mass of vehicle 100 using a mathematical model that differs from that employed by the secondary mass estimator. As discussed above, though the mass-estimation strategy employed by the main mass estimator is not as rapid as that employed by the secondary mass estimator (e.g., an RLS algorithm), the main estimated mass 255 is more accurate than the initial estimated mass 250 due, at least in part, to the calibration value 260 that is input to the main mass estimator to tune its performance. As discussed above, in some embodiments, the main mass estimator includes a non-linear KF, and the calibration value 260 is an input parameter of the non-linear KF model. As discussed further below in connection with FIG. 3, in some embodiments, the calibration value 260 is a process noise value $Q_m$.

Adjustment module 235 generally includes instructions that, when executed by the one or more processors 205, cause the one or more processors 205 to adjust automatically one or more operational parameters of the vehicle 100 based, at least in part, on the main (second) estimated mass 255 of the vehicle 100. In initiating such adjustments, adjustment module 235 can communicate with ECU 110, which, in turn, can control the operational parameters of one or more vehicle systems 120. As discussed above, such adjustments can include, without limitation, adjusting operating conditions of powertrain systems of the vehicle 100, adjusting an ACC system of the vehicle 100, adjusting a pre-collision warning system of the vehicle 100, and, in the case of an electric or hybrid vehicle 100, updating the predicted travel range of the vehicle. All four of these illustrative vehicle systems 120 just mentioned benefit from an accurate estimate of the mass of vehicle 100. For example, a pre-collision warning system can more accurately estimate the stopping distance of vehicle 100 if an accurate estimate of the mass of vehicle 100 is available from mass estimation system 140.

To facilitate discussion FIGS. 3-5 below, a table of the mathematical symbols discussed in connection with those figures is first provided in Table 1.

TABLE 1

| Notation | Definition |
|---|---|
| $\dot{x}$ | Measured/estimated wheel speed |
| $\hat{x}$ | Filtered wheel speed |
| $\ddot{x}$ | Estimated wheel acceleration |
| $a_G$ | G measurement (measured proper acceleration at CG) |
| $Q_g, R_g$ | Tuning parameters for the slope estimator (process noise and measurement noise, respectively) |
| $Q_m, R_m$ | Tuning parameters for the main mass estimator (process noise and measurement noise, respectively; $Q_m$ is a calibration value) |
| $\hat{\theta}$ | Estimated slope (road grade) |
| $F_w$ | Estimated wheel force (e.g., from an Engine ECU) |
| sft, brk, $\theta_w$ | Shift progress, brake on/off, steering wheel angle position |
| $\hat{m}_{rls}$ | Estimated mass from secondary mass estimator (initial mass estimate) |
| $\hat{m}$ | Estimated mass from main mass estimator (second mass estimate) |
| g | Gravitational acceleration |
| $C_d^e$ | Effective drag coefficients |
| $\mu_0, \mu_1$ | Road rolling resistance coefficients |
| $\phi_{ls}, y_{ls}$ | Input parameters used by RLS algorithm to solve for $\hat{m}_{rls}^{-1}$ |

Figure 3:
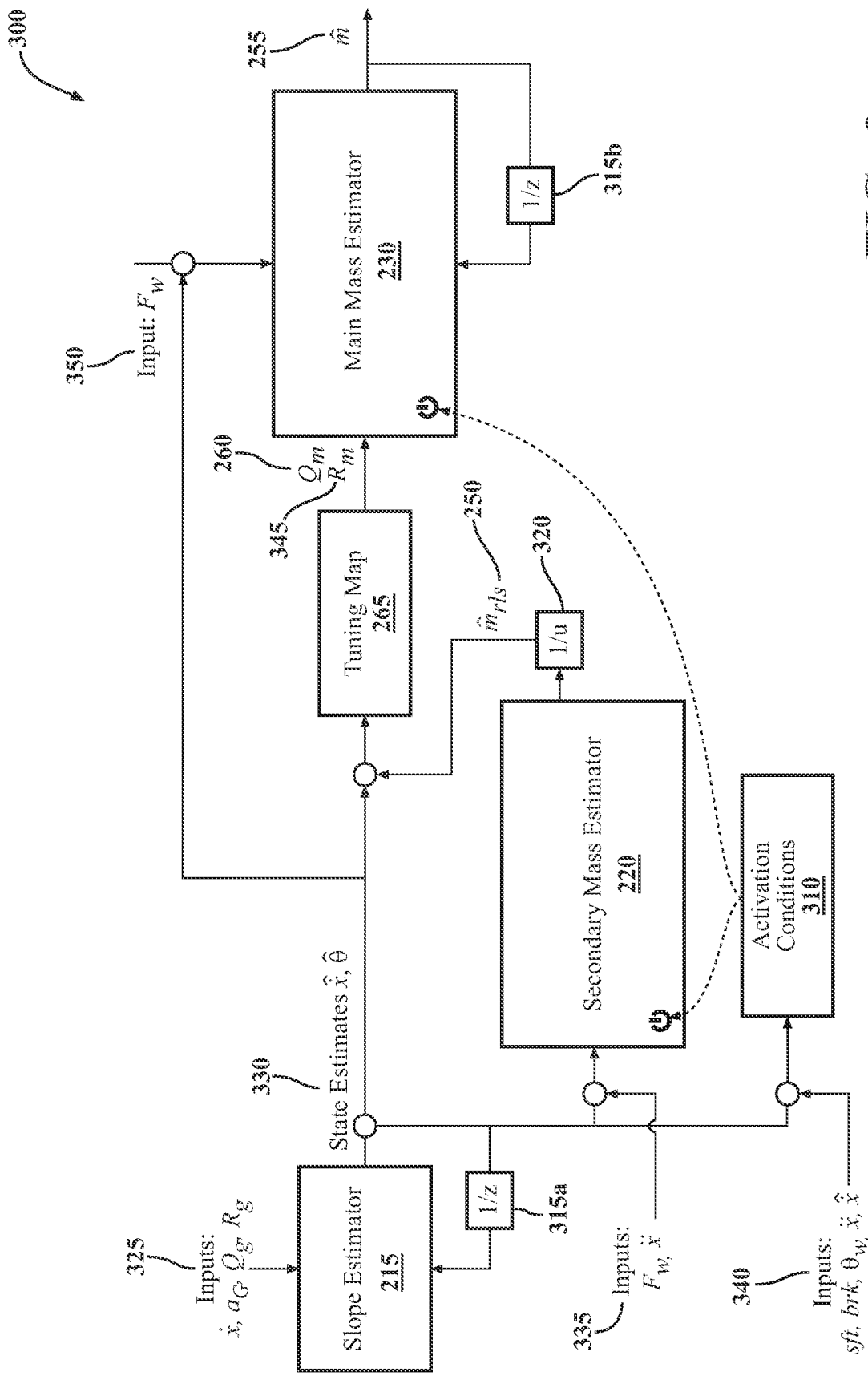
FIG. 3 illustrates a processing flow of a mass estimation system, in accordance with an illustrative embodiment of the invention.

FIG. 3 illustrates a processing flow 300 of a mass estimation system 140, in accordance with an illustrative embodiment of the invention. Processing flow 300 includes a slope estimator, which corresponds to slope estimation module 215 discussed above. In this embodiment, the slope estimator is implemented as a linear KF that receives $\dot{x}$, $a_G$, $Q_g$, and $R_g$ as inputs (325). As discussed above, a linear-KF-based slope estimator outputs state estimates $\hat{x}$ and $\hat{\theta}$ (330). One important relationship that slope estimation module 215 uses in estimating the slope (road grade) is $\ddot{x} = a_g - g\theta$. As shown in FIG. 3, processing flow 300 includes unit-delay operator 315a, which feeds back the state estimates from the preceding time step to the model.

In the embodiment of FIG. 3, the secondary mass estimator corresponds to secondary mass estimation module 220. In this embodiment, the secondary mass estimator employs a RLS mass-estimation algorithm, as discussed above. In addition to the state estimates output by the slope estimation module 215, the secondary mass estimator receives, as inputs (335), $F_w$ and $\ddot{x}$. Three important relationships the secondary mass estimator (220) uses in producing an initial estimated mass (250) of vehicle 100 are the following:

$$\phi_{ls} = F_w - C_d^e \hat{x}^2$$

$$y_{ls} = \ddot{x} + (g(\mu_0 + \mu_1 \hat{x})\cos\hat{\theta} + g\sin\hat{\theta})$$

$$\hat{m}_{rls}^{-1} = (\phi_{ls}^T \phi_{ls})^{-1} \phi_{ls}^T y_{ls}.$$

Reciprocal operator 320 inverts (reciprocates) $\hat{m}_{rls}^{-1}$ calculated by the model to produce the initial estimated mass 250 of vehicle 100, $\hat{m}_{rls}$.

As discussed above, in some embodiments, the only input to tuning map 265 is $\hat{m}_{rls}$. In the embodiment of FIG. 3, x, one of the state estimates output by the slope estimator (215), is an additional input. As discussed below in connection with FIG. 5, the tuning map 265, in this embodiment is a 2D lookup table that relates both $\hat{m}_{rls}$ and $\hat{x}$ to a corresponding value of $Q_m$ (process noise), the calibration value 260 that tunes the performance of the main mass estimator 230.

In the embodiment of FIG. 3, the main mass estimator corresponds to main mass estimation module 230. In this embodiment, the main mass estimator is implemented using a non-linear KF that receives, as inputs, the state estimates ($\hat{x}$ and $\hat{\theta}$) from the slope estimator (215) discussed above, $F_w$ (350), $Q_m$ (the calibration value 260), and $R_m$ (measurement noise 345). One important relationship used by the non-linear KF model is the following:

$$m\ddot{x} = F_w - (mg(\mu_0 + \mu_1 \dot{x}) \cos \hat{\theta} + C_d^e \dot{x}^2 + mg \sin \hat{\theta}).$$

Unit-delay operator 315b feeds back, to the model, the state estimates, including the second (main) estimated mass 255 of vehicle 100, in (255), from the preceding time step.

In the embodiment of FIG. 3, $R_m$ (measurement noise 345) is generally fixed, and $Q_m$ (process noise and calibration value 260) is used as a "tuning knob," via tuning map 265, to adjust the non-linear KF's performance to achieve the desired accuracy over a wide range of vehicle mass. As those skilled in the art are aware, these process and measurement noise covariance terms come into play in computing the predicted covariance of the state predictions and in updating the Kalman gain.

As discussed above, in some embodiments, the secondary mass estimator (220) and the main mass estimator (230) are subject to certain predetermined activation conditions. In FIG. 3, the activation conditions block 310 receives inputs 340 that include sft, brk, $\theta_w$, $\ddot{x}$, and $\hat{x}$. In one embodiment, the activation conditions are as follows:

$sft=0$ $brk=0$ $|\theta_w| < \theta_{w,max}$ $\ddot{x} > \ddot{x}_{min}$ $\hat{x}_{min} < \hat{x} < \hat{x}_{max}.$ The first condition indicates that the shift progress of the transmission of vehicle 100 is in an inactive state. The second condition indicates that the brake pedal of vehicle 100 is not being depressed. The third condition specifies that the magnitude of the steering wheel angle position of vehicle 100 is smaller than a predetermined maximum steering wheel angle. The fourth condition specifies that the estimated wheel acceleration of vehicle 100 exceeds a predetermined minimum value. The fifth and final condition specifies that the filtered wheel speed of vehicle 100 is greater than a predetermined minimum value and less than a predetermined maximum value. In one embodiment, all five of the above activation conditions need to be satisfied for the secondary mass estimator (220) and the main mass estimator (230) to be activated. In other embodiments, more, fewer, and/or different activation conditions can be imposed.

In summary and in more general terms the activation conditions (310), in the embodiment of FIG. 3, include (1) a transmission shift signal being in a predetermined transmission-shift-signal state, (2) a brake parameter being in a predetermined brake-parameter state, (3) the magnitude of the steering wheel angle position of the vehicle being smaller than a predetermined maximum steering wheel angle, (4) the estimated wheel acceleration of the vehicle exceeding a predetermined minimum wheel acceleration, and (5) the filtered wheel speed of the vehicle lying between a predetermined minimum wheel speed and a predetermined maximum wheel speed. As explained above, these activation conditions help to ensure that mass estimation system 140 estimates the mass of vehicle 100 at times that are advantageous, given the limitations of sensors 130, etc. In general, the favorable conditions correspond to relatively low-speed driving events such as exiting a parking lot to merge with traffic.

Figures 4, 5:
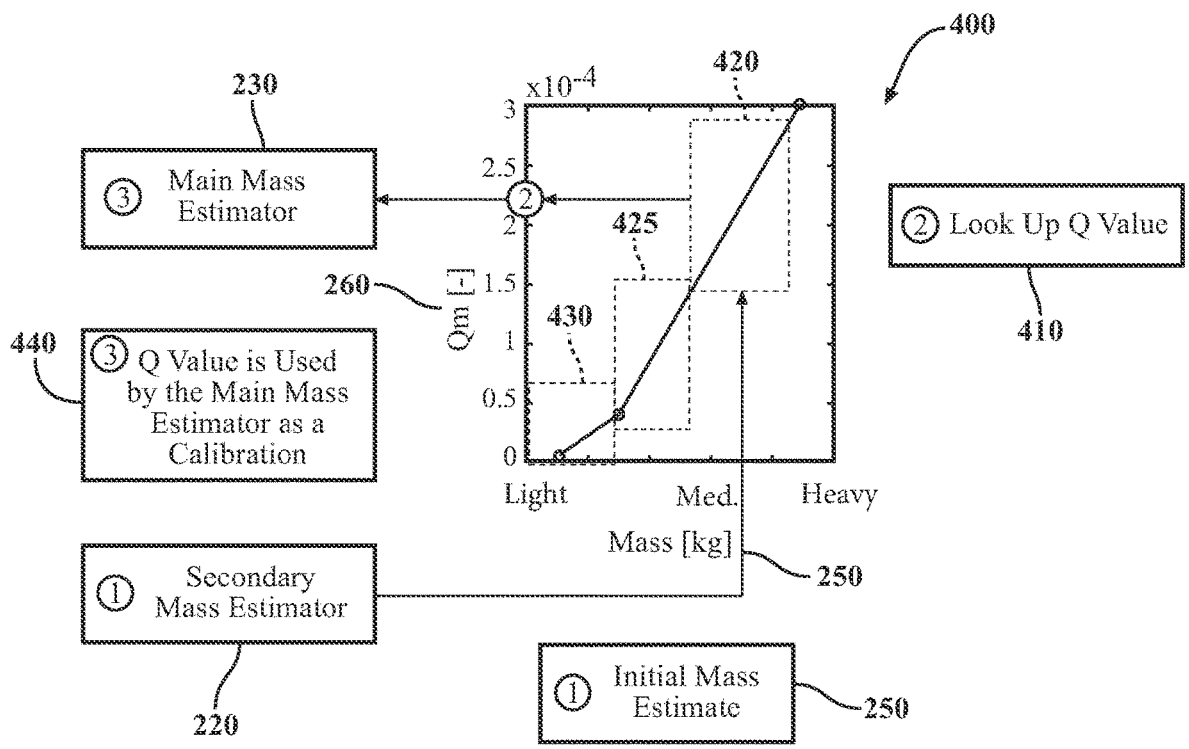
FIG. 4 illustrates how a calibration value is obtained that improves the accuracy of a second estimated mass of a vehicle from a main mass estimator, given a first estimated mass of the vehicle from a secondary mass estimator, in accordance with an illustrative embodiment of the invention.
FIG. 5 illustrates a tuning map for looking up a calibration value, in accordance with an illustrative embodiment of the invention.

FIG. 4 illustrates how a calibration value 260 (a particular value of process noise $Q_m$) is obtained that improves the accuracy of a second (main) estimated mass 255 of a vehicle 100 from a main mass estimator 230, given an initial (first) estimated mass 250 of the vehicle 100 from a secondary mass estimator 220, in accordance with an illustrative embodiment of the invention. The annotated graph 400 in FIG. 4 illustrates the steps involved in obtaining the calibration value 260. As indicated in FIG. 4, at Step 1, the secondary mass estimator 220 produces an initial estimated mass 250 ($\hat{m}_{rls}$) of the vehicle 100. At Step 2 (block 410), calibration module 225 looks up the value of $Q_m$ (260) corresponding to the initial estimated mass 250 ($\hat{m}_{rls}$). In the embodiment of FIG. 4, the possible values $Q_m$ can take on have been divided into a light range 430, a middle range 425, and a heavy range 420. In the example shown in FIG. 4, $\hat{m}_{rls}$ (250) is in the heavy range 420 due to the addition of a towable load (e.g., a trailer) to the base/towing vehicle 100, and the corresponding value of $Q_m$ for tuning the main mass estimator 230 is approximately $2.125 \times 10^{-4}$ (this value, as a number, is somewhat arbitrary and can be scaled in accordance with the requirements of the particular implementation of the non-linear KF). Note that, in FIG. 4, the abbreviation "Med." stands for "medium." At Step 3 (block 440), the main mass estimator 230 uses the selected value of $Q_m$ as a calibration value to calculate a second (main) mass estimate 255 ($\hat{m}$) of the vehicle 100 that is more accurate than the initial (first) estimated mass 250 ($\hat{m}_{rls}$).

FIG. 5 illustrates a tuning map 265 for looking up a calibration value 260, in accordance with an illustrative embodiment of the invention. Unlike the example of FIG. 4, in which the initial estimated mass 250 ($\hat{m}_{rls}$) is the single input upon which selection of the calibration value 260 ($Q_m$) depends, the tuning map 265 in FIG. 5 is a 2D lookup table that relates both the initial estimated mass 250 ($\hat{m}_{rls}$) and the filtered wheel speed $\hat{x}$ output by the slope estimator 215 to the corresponding calibration value 260. As illustrated in FIG. 5, the row headings in the leftmost column of tuning map 265 correspond to different ranges (light, medium, and heavy) of the estimated mass 250 ($\hat{m}_{rls}$). The column headings of the remaining three columns of tuning map 265 refer to different ranges (slow, medium, and fast) of the filtered wheel speed $\hat{x}$ (510). By consulting the applicable row and column in combination, a corresponding value of $Q_m$ (the calibration value 260) can be retrieved.

Figure 6:
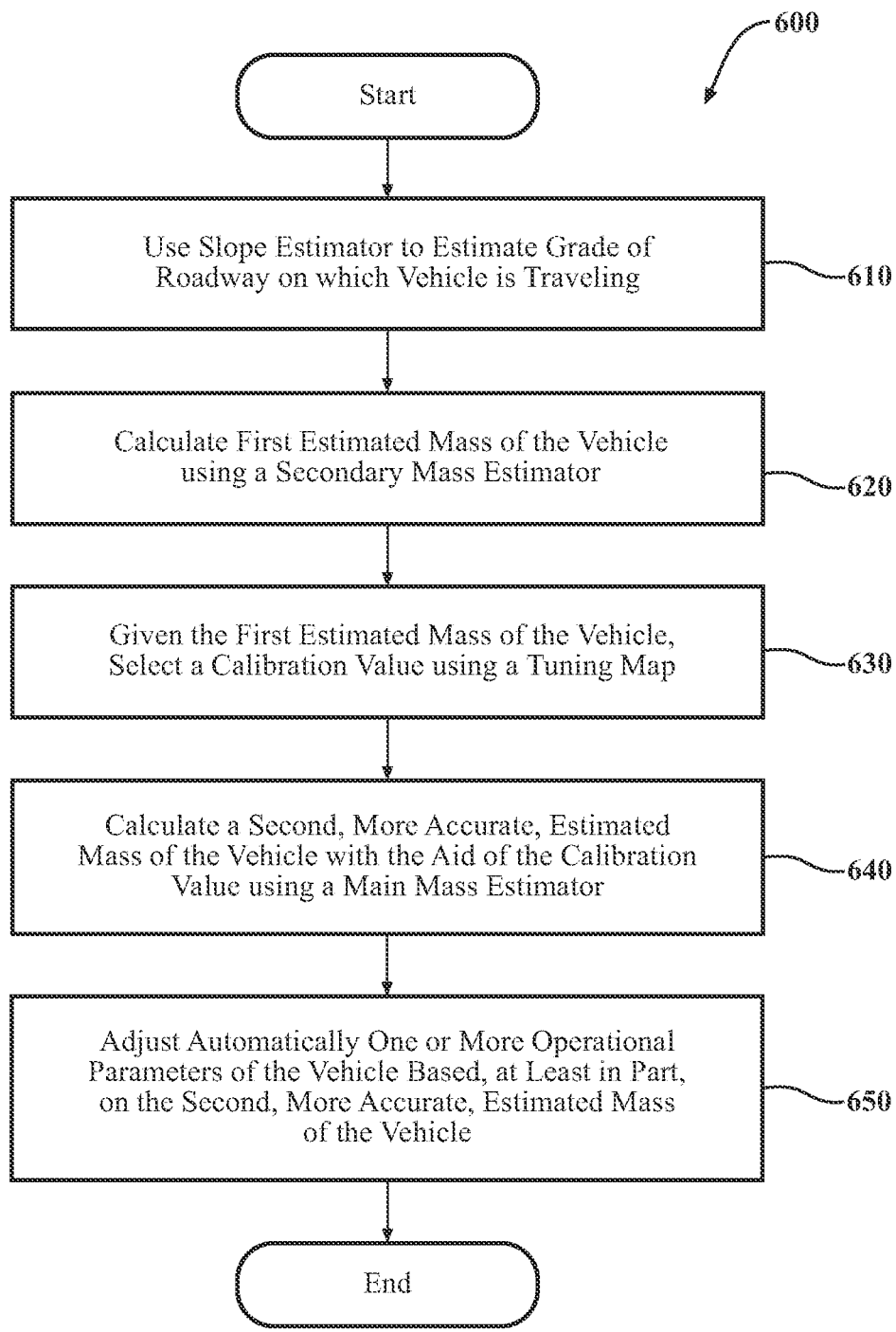
FIG. 6 is a flowchart of a method of estimating the mass of a vehicle, in accordance with an illustrative embodiment of the invention.

FIG. 6 is a flowchart of a method 600 of estimating the mass of a vehicle, in accordance with an illustrative embodiment of the invention. Method 600 will be discussed from the perspective of mass estimation system 140 in FIG. 2. While method 600 is discussed in combination with mass estimation system 140, it should be appreciated that method 600 is not limited to being implemented within mass estimation system 140, but mass estimation system 140 is instead one example of a system that may implement method 600.

At block 610, slope estimation module 215 uses a slope estimator to estimate the grade of a roadway on which a vehicle 100 is traveling. As discussed above, in some embodiments the slope estimator outputs state estimates that include a filtered wheel speed $\hat{x}$ of the vehicle 100 and an estimated slope (grade) $\hat{\theta}$ of the roadway. As discussed above, in one embodiment, the slope estimator includes a linear KF (see e.g., the embodiment of FIG. 3), and the state estimates just mentioned are outputs of the linear KF. The inputs and mathematical concepts pertaining to the slope estimator 215 are discussed in greater detail above in connection with FIG. 3.

At block 620, secondary mass estimation module 220 inputs the state estimates from the slope estimator 215, an estimated wheel force $F_w$ of the vehicle 100, and an estimated wheel acceleration $\ddot{x}$ of the vehicle 100 to a secondary mass estimator that calculates an initial (first) estimated mass 250 of the vehicle 100. As explained above, in this context, the "secondary mass estimator" is an algorithm in secondary mass estimation module 220 that estimates the mass of vehicle 100. As discussed above, the wheel force $F_w$ of the vehicle 100 and the wheel acceleration $\ddot{x}$ of the vehicle 100, in some embodiments, are measured or estimated with the aid of sensors 130 that are part of an ECU of vehicle 100. In some embodiments, the applicable ECU is, more specifically, an EFI (Electronic Fuel Injection) ECU, which is sometimes referred to in the automotive industry as an "Engine ECU." As also discussed above, in some embodiments, the secondary mass estimator employs a RLS mass estimation algorithm (refer, e.g., to the embodiment of FIG. 3). As also discussed above, the mass-estimation strategy employed by the secondary mass estimator 220 produces a mass estimate (250) more rapidly than that employed by the main mass estimator 230, but the mass estimate produced by the secondary mass estimator 220 is, in general, less accurate than that produced by the main mass estimator 230. The secondary mass estimator 220 and its underlying mathematical concepts are discussed in greater detail above in connection with FIG. 3.

At block 630, calibration module 225 selects, based at least in part on the initial estimated mass of the vehicle 250, a calibration value 260 using a tuning map 265. As discussed above, in some embodiments the tuning map 265 is a function only of the initial mass estimate 250. That is, the tuning map 265 relates an initial mass estimate 250 to a corresponding value of the calibration value 260 (e.g., via a simple lookup table). In other embodiments, the tuning map 265 is a function of two inputs. In those embodiments, tuning map 265 is a 2D lookup table that relates both the initial mass estimate 250 ($\hat{m}_{rls}$) and the filtered wheel speed $\hat{x}$ from the slope estimator (slope estimation module 215) to the corresponding output calibration value 260. Both of these embodiments are discussed in greater detail above in connection with FIGS. 4 and 5.

At block 640, main mass estimation module 230 inputs the calibration value 260 ($Q_m$), the estimated wheel force $F_w$ of the vehicle 100, the state estimates ($\hat{x}$ and $\hat{\theta}$) from the slope estimator 215, and a measurement noise value $R_m$ to a main mass estimator 230 that calculates a second (refined, more accurate) estimated mass 255 of the vehicle 100. As explained above, the second estimated mass 255 is more accurate than the initial estimated mass 250 due, at least in part, to the calibration value 260 that tunes the performance of the main mass estimator 230. As discussed above, in this context, the "main mass estimator" is an algorithm in main mass estimation module 230 that estimates the mass of vehicle 100 using a mathematical model that differs from that employed by the secondary mass estimator 220. As discussed above, though the mass-estimation strategy employed by the main mass estimator 230 is not as rapid as that employed by the secondary mass estimator 220 (e.g., an RLS algorithm), the main estimated mass 255 is more accurate than the initial estimated mass 250 due, at least in part, to the calibration value 260 that is input to the main mass estimator 230 as a tuning parameter. As discussed above, in some embodiments, the main mass estimator 230 includes a non-linear KF, and the calibration value 260 is an input (tuning) parameter of the non-linear KF model. As discussed further above in connection with FIG. 3, in some embodiments the calibration value 260 ($Q_m$) is a process noise value.

At block 650, adjustment module 235 adjusts automatically one or more operational parameters of the vehicle 100 based, at least in part, on the second estimated mass 255 of the vehicle 100. As discussed above, such adjustments can include, without limitation, adjusting operating conditions of powertrain systems of the vehicle 100, adjusting an ACC system of the vehicle 100, adjusting a pre-collision warning system of the vehicle 100, and, in the case of an electric or hybrid vehicle 100, updating the predicted travel range of the vehicle 100. All three of the illustrative vehicle systems 120 just mentioned benefit from an accurate estimate of the mass of vehicle 100. For example, a pre-collision warning system can more accurately estimate the stopping distance of vehicle 100 if an accurate estimate of the mass of vehicle 100 is available from mass estimation system 140.

In some embodiments, method 600 includes additional actions that are not shown in FIG. 6. For example, in some embodiments method 600 includes activating the main mass estimator 230 and the secondary mass estimator 220 when a set of predetermined activation conditions have been satisfied. In one embodiment, this set of predetermined activation conditions includes a transmission shift signal sft being in a predetermined transmission-shift-signal state, a brake parameter brk being in a predetermined brake-parameter state, the magnitude of the steering wheel angle position $|\theta_w|$ of the vehicle 100 being smaller than a predetermined maximum steering wheel angle $\theta_{w,max}$, the filtered wheel speed $\hat{x}$ of the vehicle 100 being between a predetermined minimum wheel speed $\hat{x}_{min}$ and a predetermined maximum wheel speed $\hat{x}_{max}$, and the estimated wheel acceleration $\ddot{x}$ of the vehicle exceeding a predetermined minimum wheel acceleration $\ddot{x}_{min}$. As explained above, in one embodiment all five of these conditions need to be satisfied for the secondary and main mass estimators to be activated.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

As used herein, "cause" or "causing" means to make, command, instruct, and/or enable an event or action to occur or at least be in a state where such event or action may occur, either in a direct or indirect manner.

Aspects herein can be embodied in other forms without departing from the spirit or essential attributes thereof. Accordingly, reference should be made to the following claims rather than to the foregoing specification, as indicating the scope hereof.

What is claimed is:

1. A system for estimating the mass of a vehicle, the system comprising:
   a processor; and
   a memory storing machine-readable instructions that, when executed by the processor, cause the processor to:
   use a slope estimator to estimate a grade of a roadway on which the vehicle is traveling, wherein the slope estimator outputs state estimates including a filtered wheel speed of the vehicle and an estimated slope of the roadway;
   input the state estimates, an estimated wheel force of the vehicle, and an estimated wheel acceleration of the vehicle to a secondary mass estimator that calculates a first estimated mass of the vehicle;
   select, based at least in part on the first estimated mass of the vehicle, a calibration value using a tuning map;

input the calibration value, the estimated wheel force of the vehicle, the state estimates, and a measurement noise value to a main mass estimator that calculates a second estimated mass of the vehicle, wherein the second estimated mass is more accurate than the first estimated mass due, at least in part, to the calibration value; and adjust automatically one or more operational parameters of the vehicle based, at least in part, on the second estimated mass of the vehicle.

2. The system of claim 1, wherein:
the slope estimator includes a linear Kalman filter;
the secondary mass estimator employs a recursive-least-squares mass estimation algorithm; and
the main mass estimator includes a non-linear Kalman filter.

3. The system of claim 1, wherein the calibration value is a process noise value.

4. The system of claim 1, wherein the tuning map includes a two-dimensional (2D) lookup table relating the first estimated mass of the vehicle and the filtered wheel speed of the vehicle to the calibration value.

5. The system of claim 1, wherein the machine-readable instructions include further instructions that, when executed by the processor, cause the processor to activate the main mass estimator and the secondary mass estimator when a set of predetermined activation conditions have been satisfied, wherein the set of predetermined activation conditions includes a transmission shift signal being in a predetermined transmission-shift-signal state, a brake parameter being in a predetermined brake-parameter state, a magnitude of a steering wheel angle position of the vehicle being smaller than a predetermined maximum steering wheel angle, the filtered wheel speed of the vehicle being between a predetermined minimum wheel speed and a predetermined maximum wheel speed, and the estimated wheel acceleration of the vehicle exceeding a predetermined minimum wheel acceleration.

6. The system of claim 1, wherein the machine-readable instructions to adjust automatically one or more operational parameters of the vehicle based, at least in part, on the second estimated mass of the vehicle include instructions that, when executed by the processor, cause the processor to perform at least one of:
adjusting operating conditions of one or more powertrain systems of the vehicle;
adjusting an adaptive cruise control system of the vehicle;
adjusting a pre-collision warning system of the vehicle; and
updating a predicted travel range of the vehicle, wherein the vehicle is an electric vehicle.

7. The system of claim 1, wherein the vehicle is one of a passenger pickup truck, a commercial light-duty truck, and a commercial heavy-duty truck.

8. The system of claim 7, wherein the mass of the vehicle can increase due to at least one of the vehicle being loaded with cargo and a towable load being hitched to the vehicle.

9. A non-transitory computer-readable medium for estimating the mass of a vehicle and storing instructions that, when executed by a processor, cause the processor to:
use a slope estimator to estimate a grade of a roadway on which the vehicle is traveling, wherein the slope estimator outputs state estimates including a filtered wheel speed of the vehicle and an estimated slope of the roadway;
input the state estimates, an estimated wheel force of the vehicle, and an estimated wheel acceleration of the vehicle to a secondary mass estimator that calculates a first estimated mass of the vehicle;
select, based at least in part on the first estimated mass of the vehicle, a calibration value using a tuning map;
input the calibration value, the estimated wheel force of the vehicle, the state estimates, and a measurement noise value to a main mass estimator that calculates a second estimated mass of the vehicle, wherein the second estimated mass is more accurate than the first estimated mass due, at least in part, to the calibration value; and
adjust automatically one or more operational parameters of the vehicle based, at least in part, on the second estimated mass of the vehicle.

10. The non-transitory computer-readable medium of claim 9, wherein:
the slope estimator includes a linear Kalman filter;
the secondary mass estimator employs a recursive-least-squares mass estimation algorithm; and
the main mass estimator includes a non-linear Kalman filter.

11. The non-transitory computer-readable medium of claim 9, wherein the calibration value is a process noise value.

12. The non-transitory computer-readable medium of claim 9, wherein the tuning map includes a two-dimensional (2D) lookup table relating the first estimated mass of the vehicle and the filtered wheel speed of the vehicle to the calibration value.

13. A method, comprising:
using a slope estimator to estimate a grade of a roadway on which a vehicle is traveling, wherein the slope estimator outputs state estimates including a filtered wheel speed of the vehicle and an estimated slope of the roadway;
inputting the state estimates, an estimated wheel force of the vehicle, and an estimated wheel acceleration of the vehicle to a secondary mass estimator that calculates a first estimated mass of the vehicle;
selecting, based at least in part on the first estimated mass of the vehicle, a calibration value using a tuning map;
inputting the calibration value, the estimated wheel force of the vehicle, the state estimates, and a measurement noise value to a main mass estimator that calculates a second estimated mass of the vehicle, wherein the second estimated mass is more accurate than the first estimated mass due, at least in part, to the calibration value; and
adjusting automatically one or more operational parameters of the vehicle based, at least in part, on the second estimated mass of the vehicle.

14. The method of claim 13, wherein:
the slope estimator includes a linear Kalman filter;
the secondary mass estimator employs a recursive-least-squares mass estimation algorithm; and
the main mass estimator includes a non-linear Kalman filter.

15. The method of claim 13, wherein the calibration value is a process noise value.

16. The method of claim 13, wherein the tuning map includes a two-dimensional (2D) lookup table relating the first estimated mass of the vehicle and the filtered wheel speed of the vehicle to the calibration value.

17. The method of claim 13, further comprising activating the main mass estimator and the secondary mass estimator when a set of predetermined activation conditions have been satisfied, wherein the set of predetermined activation conditions includes a transmission shift signal being in a predetermined transmission-shift-signal state, a brake parameter being in a predetermined brake-parameter state, a magnitude of a steering wheel angle position of the vehicle being smaller than a predetermined maximum steering wheel angle, the filtered wheel speed of the vehicle being between a predetermined minimum wheel speed and a predetermined maximum wheel speed, and the estimated wheel acceleration of the vehicle exceeding a predetermined minimum wheel acceleration.

18. The method of claim 13, wherein the adjusting automatically one or more operational parameters of the vehicle based, at least in part, on the second estimated mass of the vehicle includes at least one of:
   adjusting operating conditions of one or more powertrain systems of the vehicle;
   adjusting an adaptive cruise control system of the vehicle;
   adjusting a pre-collision warning system of the vehicle; and
   updating a predicted travel range of the vehicle, wherein the vehicle is an electric vehicle.

19. The method of claim 13, wherein the vehicle is one of a passenger pickup truck, a commercial light-duty truck, and a commercial heavy-duty truck.

20. The method of claim 19, wherein the mass of the vehicle can increase due to at least one of the vehicle being loaded with cargo and a towable load being hitched to the vehicle.

* * * * *